UNITED STATES PATENT OFFICE.

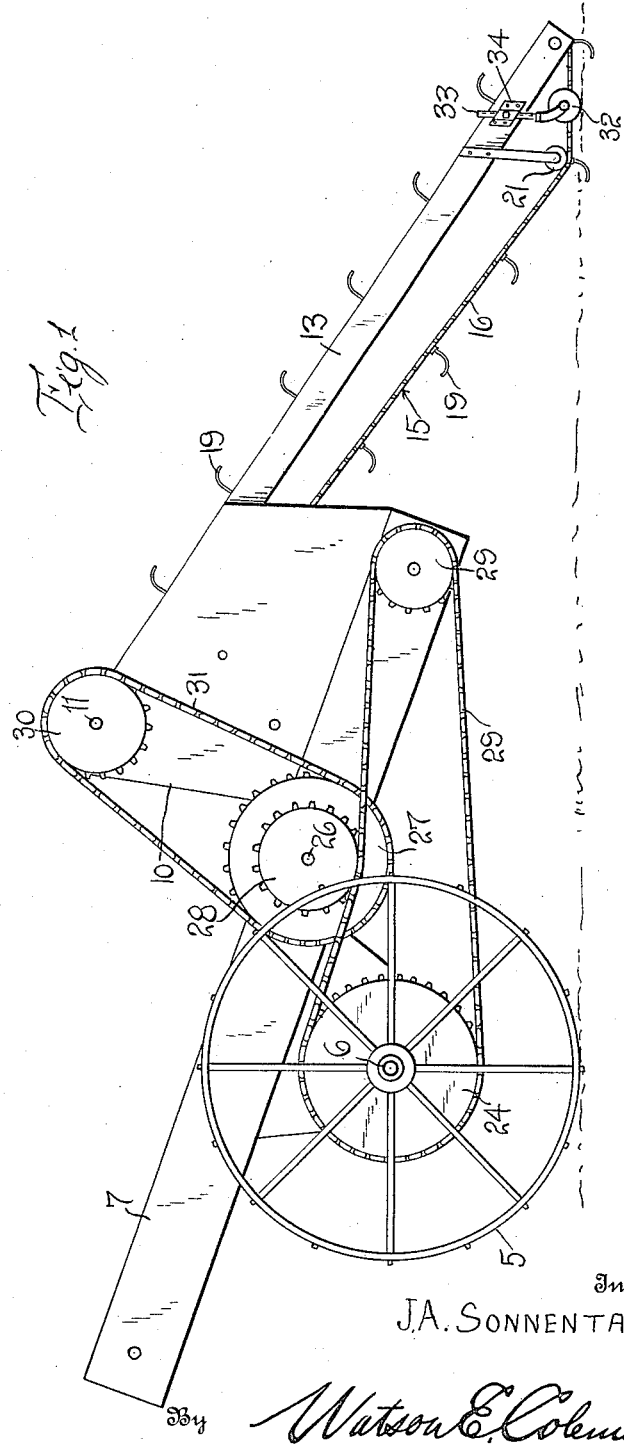

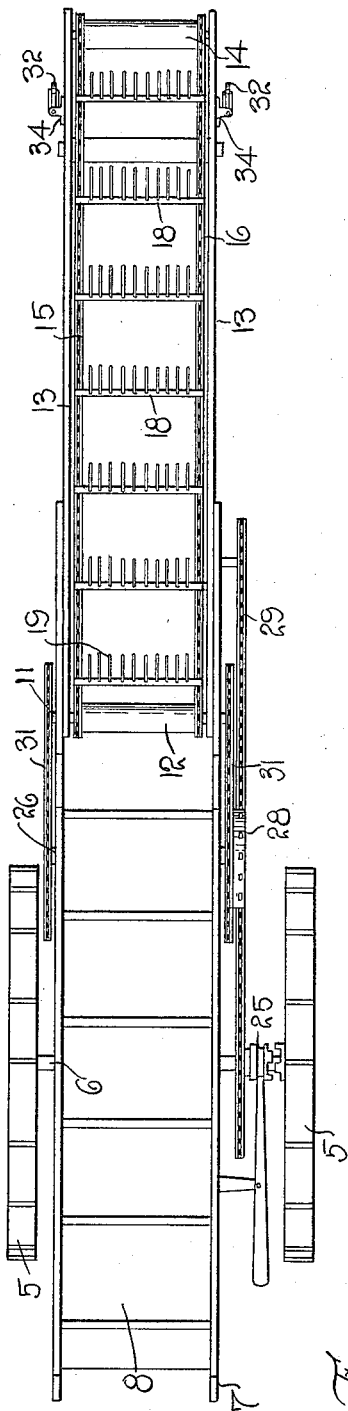

JACOB A. SONNENTAG, OF BOYD, WISCONSIN.

STONE-PICKER.

1,163,700.

Specification of Letters Patent.

Patented Dec. 14, 1915.

Application filed June 21, 1915. Serial No. 35,411.

*To all whom it may concern:*

Be it known that I, JACOB A. SONNENTAG, a citizen of the United States, residing at Boyd, in the county of Chippewa and State of Wisconsin, have invented certain new and useful Improvements in Stone-Pickers, of which the following is a specification, reference being had to the accompanying drawings.

This invention relates to an improved stone picker and has for its primary object to provide a machine for quickly and thoroughly clearing a field of stones or boulders.

The invention has for a more particular object to provide a machine for the above purpose embodying a wheel supported elevator, an endless conveyer provided with means for gathering and conveying the stones, and improved means for dumping or discharging the stones from the conveyer upon the elevator.

It is an additional object of my invention to provide a stone picking machine in which an endless conveyer is employed, said conveyer consisting of a plurality of series of stone gathering fingers, and means for easily and quickly adjusting the conveyer to regulate the depth to which said fingers will enter the ground.

With the above and other objects in view, my invention consists in the novel features of construction, combination and arrangement of parts to be hereinafter more fully described, claimed and illustrated in the accompanying drawings, in which, Figure 1 is a side elevation of a stone picking machine constructed in accordance with the preferred embodiment of the invention; Fig. 2 is a top plan view thereof; Fig. 3 is an enlarged detail sectional view illustrating the manner in which the stones are dumped from the conveyer upon the elevator; and Fig. 4 is a detail fragmentary perspective view of the rear end of the conveyer showing the means for adjusting the supporting wheels.

Referring in detail to the drawing, 5 designates the main ground wheels of the machine which are revolubly mounted upon the opposite ends of an axle 6. A frame 7 is suitably mounted and supported intermediate of its ends upon this axle, and in the frame an endless elevator, indicated at 8, is arranged, said elevator traversing the transverse rollers 9 which are rotatably mounted in the opposite ends of the frame.

Uprights or standards 10 are suitably fixed at their lower ends to the frame 7 rearwardly of the wheel axle 6, and in these spaced uprights, the ends of the transverse shaft 11 are journaled. A roller 12 is suitably secured upon said shaft, and at opposite ends of this roller the upper ends of the inclined parallel bars 13 are loosely engaged upon the shaft 11. Between the lower ends of the bars 13, a second roller 14 is mounted. An endless conveyer 15 is arranged between the parallel bars 13. This conveyer consists of the two endless side chains 16 which traverse the sprockets 17 secured to the opposite ends of the rollers 12 and 14. The spaced chains 16 are connected at intervals by the steel slats or transverse bars 18. To each of said bars, a plurality of picker teeth or fingers 19 are detachably secured, said teeth having straight shank portions insertible through openings provided in the transverse conveyer slats 18, and upon said shanks the clamping nuts 20 are threaded for engagement against the upper and lower faces of said slats. In order to guide and direct the teeth or fingers 19 into engagement with the ground as the endless conveyer passes around the lower roller 14, I provide the transverse guide roller 21 which is mounted in hangers secured to the bars 13.

Upon each of the bars 13, adjacent to its upper end and on the inner face thereof, the guide rollers or sprockets 22 and 23 are journaled upon stub shafts fixed in the standards 10. It will be noted that the rear guide roller 23 is disposed in a plane slightly above the forward roller 22. The conveyer chains 16 pass over the rear roller 23 and then around the forward roller 22 and upwardly to the sprockets 17 on the ends of the roller 12, as clearly shown in Fig. 3 of the drawing. It will thus be seen that the picker teeth or fingers are thrown rearwardly as the chains pass over the rollers 23, so that the stones or rocks carried between the hooks on the free ends of said fingers will be dumped or discharged upon the rear end of the elevator 8. This elevator is of the usual type and is provided with spaced transverse slots so that the stones deposited thereon are carried upwardly and dumped or discharged into a wagon which is coupled in any suitable manner to the machine.

Upon the wheel axle 6, adjacent to one of the ground wheels 5, a large sprocket wheel 24 is loosely mounted and is provided upon one face with a shiftable clutch 25 which is adapted to be shifted by means of a suitable lever into engagement with the clutch teeth on the hub of the wheel 5 so that said sprocket is locked to the wheel and driven thereby. In the elevator frame 7, rearwardly of the wheel axle 6, the transverse shaft 26 is journaled at its ends, and upon each end of this shaft a sprocket wheel 27 is fixed, and said wheel is provided upon one side with a relatively small sprocket wheel 28. A drive chain 29 is engaged around the sprocket wheel 24, the upper stretch of this chain engaging under the small sprocket wheel 28 and driving the shaft 26. This chain then extends rearwardly over a sprocket wheel 29 fixed upon one end of the rear supporting roller 9 for the elevator 8, whereby said elevator is driven in the proper direction. Upon each end of the upper conveyer shaft 11, a sprocket wheel 30 is fixed, and each of these sprocket wheels is connected to the corresponding sprocket wheel 27 on the shaft 26 by means of the endless chain 31. Thus, it will be readily understood that the apron and conveyer are driven in relatively opposite directions.

In order to adjust the lower rear end of the conveyer 15 so that the picker fingers 19 will enter the ground to the desired depth, I provide the adjustable supporting rollers 32 which are provided with axle rods 33 pivotally mounted in suitable bearing members 34 fixed to the lower ends of the bars 13. Set screws, indicated at 35, or any other approved means, may be employed for securing the axles in the bearings against pivotal movement and thus retaining the wheels 32 in their adjusted positions with respect to the bars 13. By properly adjusting these wheels, the rear lower ends of the bars 13 and, consequently, the lower end of the conveyer mounted therein, may be raised or lowered so that the teeth or fingers 19 will penetrate the soil to the desired depth.

From the foregoing description, taken in connection with the accompanying drawing, it is believed that the construction, manner of operation and several advantages of my invention can be clearly and fully understood. The machine will easily and quickly clear a large field of stones, and the gathering fingers or teeth 19 are close enough together to hold even small size stones but still permit the earth to sift between the fingers. The several parts employed in the construction of the machine are quite simple in form so that the mechanism is not liable to get out of order, and will not require frequent repairs. Should any one of the gathering fingers or teeth become broken, it may be very easily and quickly removed from the conveyer slats 18 and replaced by a new finger at nominal expense. While I preferably drive the gathering conveyer from both sides of the machine, it will be understood that, if desired, only one of the driving chains 31 may be employed. The machine is also susceptible of considerable modification in the form, proportion and arrangement of the several parts thereof and I, therefore, reserve the privilege of resorting to all such legitimate changes as may be fairly embodied within the spirit and scope of the invention as claimed.

Having thus fully described my invention, what I desire to claim and secure by Letters Patent is:—

1. In a machine of the character described, an elevator, a conveyer having one of its ends disposed above the lower end of the elevator, said conveyer including a plurality of spaced article holders, means for angularly directing one stretch of the conveyer above the elevator to discharge the articles in said holders upon the elevator, and means for driving the elevator and conveyer in relatively opposite directions.

2. In a machine of the character described, an inclined elevator, an inclined conveyer having its upper end disposed above the lower end of the elevator, said conveyer including spaced endless conveyer chains and a plurality of spaced slats connecting the chains, gathering fingers secured to each of said slats, spaced guide rollers for the lower stretch of the conveyer mounted above the elevator to direct the conveyer chains and cause the material to be dumped from the gathering members upon the elevator, and means for driving the elevator and conveyer in relatively opposite directions.

3. In a stone gathering machine, an inclined elevator, an inclined conveyer having its upper end mounted upon the lower end of the elevator, adjustable ground wheels to support the lower end of the conveyer, said conveyer including spaced endless chains and a plurality of transverse slats connecting the same, gathering fingers secured to said slats, spaced guide rollers for each of the conveyer chains causing the chains to travel in an angular direction above the elevator whereby the material held by the gathering members is discharged upon the rear end of the elevator, and means for driving the elevator and conveyer in relatively opposite directions.

4. In a stone gathering machine, a wheel supported inclined elevator, an inclined conveyer having its upper end mounted above the lower end of the elevator, said conveyer including spaced endless chains connected by a plurality of transverse slats, spaced gathering fingers secured to each of the slats, a guide roller to cause the conveyer at its lower end to travel in parallel relation to the ground, adjustable ground wheels for supporting the lower end of the conveyer and regulating the depth to which the gathering fingers enter the ground, spaced guide rollers for the conveyer chains mounted above the lower end of the elevator to angularly direct said chains and cause the stones held by the gathering fingers to be dumped upon said elevator, and means for driving the elevator and conveyer in relatively opposite directions.

In testimony whereof I hereunto affix my signature in the presence of two witnesses.

JACOB A. SONNENTAG.

Witnesses:
B. H. MATZKE,
JOE SELIGER.

Copies of this patent may be obtained for five cents each, by addressing the "Commissioner of Patents, Washington, D. C."